May 14, 1946.    C. C. COONS    2,400,192
REFRIGERATION
Filed Aug. 9, 1943
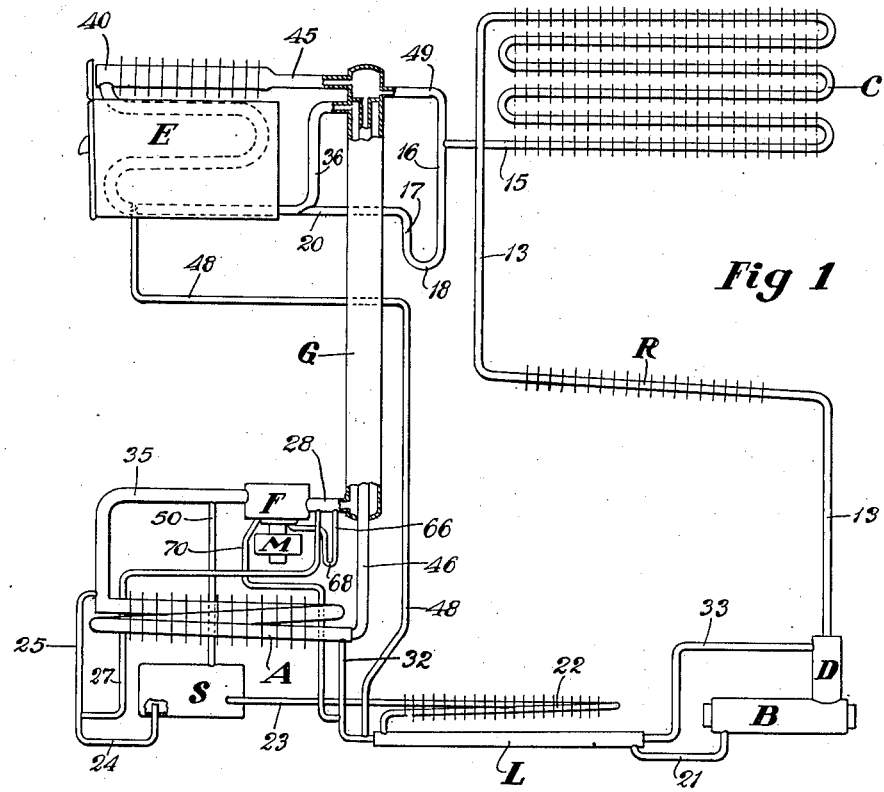
Fig 1
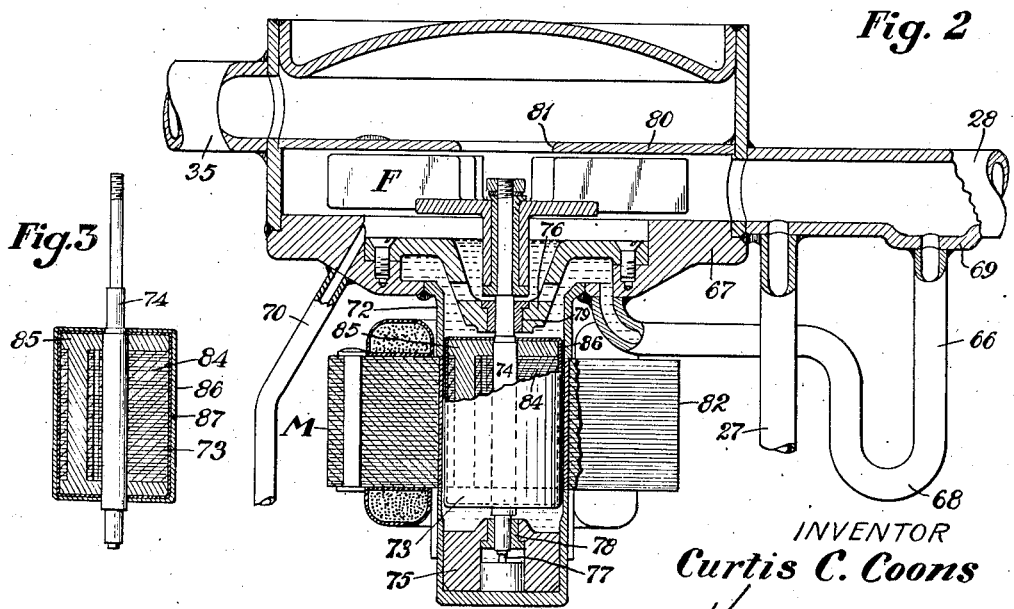
INVENTOR
Curtis C. Coons
BY Harry S. Dumarsy
ATTORNEY Patented May 14, 1946

2,400,192

UNITED STATES PATENT OFFICE 2,400,192

REFRIGERATION

Curtis C. Coons, North Canton, Ohio, assignor to The Hoover Company, North Canton, Ohio, a corporation of Ohio Application August 9, 1943, Serial No. 497,889

2 Claims. (Cl. 62—119.5)

This invention relates to refrigeration and more particularly to an absorption refrigerating apparatus of the type using a pressure equalizing medium and having power means for circulating the mediums within the apparatus.

The invention of this application is an improvement over the patent to Coons 2,317,520 granted April 27, 1943.

In a modern refrigerating apparatus of the type referred to in which a power unit is utilized for circulating the mediums, it is necessary that the moving parts of the power unit be sealed within the walls of the apparatus. Some means must therefore be provided for lubricating the power unit in such a manner that it is not necessary to service the machine during its lifetime.

In absorption refrigerating apparatuses using ammonia as the refrigerant, the internal pressures are very high and as a consequence the walls of the apparatus must be made of high strength steel, usually welded together in an integral structure. From this it can be seen that to service the power units of such machines, it would be necessary to return the entire unit to the factory.

It is therefore an object of this invention to provide an absorption refrigerating apparatus, using ammonia as the refrigerant, having moving parts of the power unit sealed within the integral walls of the apparatus, in which it is unnecessary to service the power unit for long periods of time.

Ammonia is readily soluble in water, can be readily separated therefrom by the application of heat and has a high heat of vaporization. It is therefore an excellent substance for use as the refrigerant in an absorption refrigerating machine. It has, however, the disadvantage that it attacks materials of which such machines are usually made.

In the past the rotor of the medium circulator for the three-fluid absorption refrigerating apparatus using ammonia as the refrigerant has been made of stainless steel and the conductor bars and end rings of aluminum in order that the rotor would not be corroded by the ammonia. However, stainless steel is very expensive, much more difficult to fabricate than soft magnetic steel and does not have as good magnetic properties as soft magnetic steel and aluminum is not as good a conductor as copper, but both soft magnetic steel and copper are readily attacked by the ammonia.

According to the present invention the motor rotor is made of soft magnetic iron and the conductor bars and end rings of copper and both the iron and copper are coated by spraying them with molten stainless steel. It has been found that the sprayed stainless steel is not penetrated by the ammonia and efficiently protects the iron and copper from corrosion.

In order to prevent the possibility of an electrolytic action between the stainless steel coating and the copper of the conductor bars and end rings, the rotor may be, according to another phase of this invention, coated with a hard lacquer prior to being sprayed with the molten stainless steel.

It is another object of this invention to lubricate the power unit of an absorption refrigerating machine with a liquid medium normally contained within the machine and collect this liquid medium from some portion of the machine in which the liquid medium is condensed from a vaporous state.

Other objects and advantages of this invention will become apparent as the description proceeds when taken in connection with the accompanying drawing, in which:

Figure 1 is a diagrammatic representation of an absorption refrigerating apparatus embodying the principles of this invention;

Figure 2 is a longitudinal sectional view of the power unit according to this invention, depicting how the rotor of the power unit is submerged in the liquid medium; and Figure 3 is a modified form of a rotor for the motor, showing a lacquer coating between the sprayed stainless steel coating and the copper of the conductor bars and end rings.

Referring to Figure 1 of the drawing there is disclosed a three-fluid absorption refrigerating system comprising a boiler B, an analyzer D, an air cooled rectifier R, a tubular air cooled condenser C, an evaporator E, a gas heat exchanger G, a tubular air cooled absorber A, a solution reservoir S, a liquid heat exchanger L and a circulating fan F which is driven by an electric motor M.

The above-described elements are interconnected by various conduits to form a plurality of gas and liquid circuits constituting a complete refrigerating system to which reference will be made in more detail hereinafter.

The refrigerating system will be charged with a suitable refrigerant such as ammonia, a suitable absorbent such as water, and a suitable pressure equalizing medium such as hydrogen or nitrogen.

The application of heat to the boiler B liberates refrigerant vapor from the strong solution contained therein. The vapor so liberated passes upwardly through the analyzer D in counterflow relationship to strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air cooled rectifier R wherein any vapor of absorption solution passing through the analyzer is condensed and returned to the analyzer through the conduit 13.

The refrigerant vapor is liquefied in the condenser by heat exchange relation with atmospheric air and is discharged from the bottom portion thereof through conduit 15 into a downwardly extending conduit 16. The bottom portion of the conduit 16 connects to the bottom portion of an upwardly extending conduit 17 through a U-bend 19. Conduit 16 is appreciably longer than the conduit 17 for a purpose to be described later. The conduit 17 opens at its upper end into a conduit 20 which discharges into the evaporator E in a manner to be described more fully hereinafter.

The weak solution formed in the boiler by the generation of refrigerant vapor therefrom is conveyed from the boiler through a conduit 21, the outer pass of liquid heat exchanger L, through a pre-cooler 22 and a conduit 23 into the solution reservoir S. The weak solution is conveyed from the solution reservoir S through a U-shaped conduit 24 opening into an upwardly extending tube 25, of small diameter, and forming a gas lift pump which discharges into the top of the absorber A. It is apparent that the top of the absorber is materially above the solution level normally prevailing in the boiler-analyzer-reservoir system whereby some means must be provided to elevate the absorption solution to the top of the absorber A. For this purpose a small bleed conduit 27 is connected to the discharge conduit 28 of the circulating fan F and leads to the junction of the conduits 24 and 25 which is below the solution level normally prevailing in the reservoir whereby the weak solution is elevated to the top of the absorber A by gas lift action.

In the absorber A the weak solution flows downwardly by gravity in counterflow to the rich pressure equalizing medium refrigerant vapor mixture, flowing upwardly therethrough. The refrigerant vapor content of the mixture is absorbed in the absorption solution and the heat of absorption is rejected to the surrounding air by air cooling fins which are mounted on the exterior walls of the absorber vessel A. Strong solution formed in the absorber A discharges into conduit 32 which opens into the inner pass of the liquid heat exchanger L. From the inner pass of the liquid heat exchanger L the strong solution is conveyed to the upper portion of the analyzer D by conduit 33 whereby as previously described it flows downwardly through the analyzer in counterflow to the rising vapors generated in the boiler.

The weak pressure equalizing medium refrigerant vapor mixture present in the absorber A is taken from the upper portion thereof through the conduit 35 into the suction side of the circulating fan F in which it is placed under pressure and discharged from the conduit 28 into the outer pass of the gas heat exchanger G and therefrom through a downwardly extending conduit 36 into the bottom of the evaporator E.

The conduit 20 opens into the bottom portion of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant with it through the evaporator into the box cooling conduit 40 as the refrigerant is evaporated by diffusion into the pressure equalizing medium to produce refrigeration. In the conduit 40 the velocity of the inert gas stream is relatively slow by reason of the large diameter of that conduit and the liquid refrigerant flows therethrough by gravity. Any liquid refrigerant not evaporated in the evaporator will flow through the conduit 45, the inner pass of the gas heat exchanger G and pass by conduit 46 to the bottom of the absorber.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of the absorber A through a conduit 46. In the absorber A the rich pressure equalizing medium refrigerant vapor mixture flows upwardly in counterflow to absorption solution whereby the refrigerant vapor content of the mixture is absorbed by the weak solution.

The bottom coil of the evaporator E is provided with a drain conduit 48 which opens into the strong solution discharge conduit 32. The conduit 48 opens into the top portion of the bottom coil of the evaporator whereby it will not completely drain said conduit. The upper portion of the discharge conduit 15 of the condenser is vented through a vent conduit 49 into the inner pass of the gas heat exchanger G. The solution reservoir S is vented through a conduit 50 into the suction conduit 35 of the circulating fan F.

The circulating fan F places the pressure equalizing medium discharged therefrom under a small pressure, in the neighborhood of a pressure of a few inches of water, over that prevailing in the suction side of the fan F. In order to prevent this pressure which also prevails in the conduit 36 from being carried back through the condenser discharge conduit, the condenser and conduit 15 to the analyzer, the conduit 16 is made appreciably longer than the conduit 17 whereby a pressure balancing column of liquid is formed in the conduit 16 which extends above the point of connection between the conduits 17 and 20 a distance sufficient to overcome the pressure produced by the circulating fan in the conduit 36.

Leading from the fan discharge conduit 28 adjacent the bottom of the outer pass of the gas heat exchanger G is a conduit 66 which opens into the interior of the bottom plate 67 of the fan casing as clearly shown in Figure 2. The conduit 66 has a U-bend portion 68 for a purpose which will be described later. The conduit 28 has a downwardly extending bulge 69 where the conduit 66 is attached thereto.

A conduit 70 leads from the bottom plate 67 of the fan casing to the strong solution return conduit 32.

Referring to Figure 2 the motor fan unit comprises a casing for the fan and a shell 72 separating the motor rotor 73 from the motor field structure 82. The portion of the shell 72 between the rotor and the field structure is made very thin to reduce the effective air gap between the rotor and stator and is supported against internal pressure by the field structure 82 being pressed tightly thereover. The rotor 73 is rigidly connected to the fan F by shaft 74 which is rotatably supported on the interior of the casing by bearing assemblies 75 and 76.

The lower bearing assembly 75 includes a two part thrust bearing 77 of very hard material such as tungsten carbide and a large clearance Babbitt radial bearing 78. The top bearing assembly also includes a large clearance Babbitt radial bearing 79. The shaft 74 is preferably made of stainless steel.

The fan casing is divided into a suction chamber and a high pressure chamber by plate 80 having an aperture 81 leading to the suction side of the fan F.

The rotor 73 is of the squirrel cage type and has a core 84 made of laminations of soft magnetic iron and conductor bars and end rings 85 are made of copper. In order to protect the soft iron core 84 and the copper conductor bars and end rings 85 from corrosion by the ammonia a coating 86 of stainless steel is sprayed over the entire surface of the rotor 73.

During operation all of the refrigerant vapor is not removed from the inert gas in the absorber A so that the gaseous medium leaving the absorber is a lean mixture of refrigerant vapor and inert medium which leaves the absorber in a comparatively warm state. When this warm mixture comes into heat exchange relationship with cold inert medium refrigerant vapor mixture returning to the absorber A from the evaporator E it becomes cold and a small amount will be condensed out and flow to the bottom of the outer pass of the gas heat exchanger G, into the pocket 69 in the tube 23. It will then flow through the tube 66 into the interior of the motor fan casing and will eventually completely submerge the rotor 73 to the level shown in Figure 2. Any excess liquid will drain through the conduit 70 back to the solution circuit.

The pressure in the conduit 28 being that of the high pressure side of the fan and the pressure within the shell being somewhat lower pressure the liquid level in the right hand leg of the U-member 68 will be lower than the level within the motor fan casing by an amount sufficient to balance this difference in pressure.

By submerging the rotor 73 in a liquid medium the rotor centers itself as it reaches its operating speed. This is due to the fact that if the rotor is off-center at the beginning of its operation the liquid will tend to rotate with the rotor and be drawn between the rotor 73 and the shell 72 at a point where the rotor is closest to the shell and move it away from the shell at that point. This action will continue until the rotor is completely centralized. It is to be noted that the space between the rotor and the shell when the rotor is centered is very small and may be only a few thousandths of an inch.

The fact that the action of the lubricant automatically centers the rotor renders it possible to make the radial Babbitt bearings 78 and 79 with a much larger clearance between the bearing surfaces and that of the shaft 74 than would otherwise be possible. Thus the bearing surfaces are only in contact when the rotor is starting and the wear thereon will be negligible. The buoyant effect of the liquid medium will also lighten the load on the thrust bearing 77 and thereby reduce the wear thereon. Since the radial bearings are out of contact with the shaft during operation a much quieter motor will result.

It has been found that the sprayed stainless steel coating on the exterior of the rotor 73 will not be penetrated by the ammonia and will adequately protect the soft iron of the core 84 and the copper of the conductor bars and end rings 85 from corrosion. However, the ammonia may act as an electrolyte and in order to prevent an electrolytic action between the stainless steel coating 86 and the copper of the conductor bars and end rings 85, a coating 87 of hard lacquer may be provided between the copper conductor bars and end rings 85 and the stainless steel coating 86 as shown in Figure 3.

From the foregoing it can be seen that this invention provides a medium circulator for a three-fluid absorption refrigerating machine in which the rotor is submerged in a liquid normally contained within the apparatus and is protected from the corrosive atmosphere of ammonia by the sprayed stainless steel coating 86 which will render the apparatus operable over long periods of time without attention being paid to the medium circulator.

While I have shown but two embodiments of this invention it is to be understood that those embodiments are to be taken as illustrative only and not in a limiting sense. I do not wish to be limited to the specific structure shown and described but to include all equivalent variations thereof except as limited by the scope of the claims.

I claim:

1. In a three-fluid absorption refrigerating apparatus, a medium circulator for circulating fluids in said apparatus, a vertically extending casing hermetically sealed to the apparatus walls, a squirrel cage motor rotor and fan mounted in said casing for rotation on a vertical axis and means for leading liquid condensate into said casing, said casing being so constructed and arranged that the motor is submerged in the liquid condensate, said rotor comprising a core of soft iron laminations, copper conductor bars and end rings, a coating of lacquer covering said core, conductor bars and end rings and a thin coating of stainless steel covering said lacquer coating.

2. A hermetically sealed medium circulator for a three-fluid absorption refrigerating apparatus comprising, a vertically extending hermetically sealed casing, said casing being so positioned as to collect liquid ammonia which condenses in the apparatus and a squirrel cage motor rotor and fan in said casing mounted for rotation on a vertical axis so that said rotor is submerged in condensed liquid ammonia, said rotor being constructed of iron laminations with copper conductor bars and end rings and having a sprayed stainless steel coating to protect the iron and copper against corrosion by the ammonia and being separated from the iron and copper by a coating of hard lacquer.

CURTIS C. COONS.